(12) United States Patent
Kuwamura et al.

(10) Patent No.: US 11,187,097 B2
(45) Date of Patent: Nov. 30, 2021

(54) ROTARY MACHINE

(71) Applicant: Mitsubishi Hitachi Power Systems, Ltd., Yokohama (JP)

(72) Inventors: Yoshihiro Kuwamura, Tokyo (JP); Eiji Konishi, Tokyo (JP); Toyoharu Nishikawa, Tokyo (JP); Shin Nishimoto, Yokohama (JP); Hidekazu Uehara, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 503 days.

(21) Appl. No.: 16/076,750

(22) PCT Filed: Feb. 17, 2017

(86) PCT No.: PCT/JP2017/005978
§ 371 (c)(1),
(2) Date: Aug. 9, 2018

(87) PCT Pub. No.: WO2017/142077
PCT Pub. Date: Aug. 24, 2017

(65) Prior Publication Data
US 2019/0048734 A1   Feb. 14, 2019

(30) Foreign Application Priority Data

Feb. 19, 2016 (JP) .............................. JP2016-030236

(51) Int. Cl.
*F01D 11/02* (2006.01)
*F01D 11/08* (2006.01)
(Continued)

(52) U.S. Cl.
CPC ............. *F01D 11/02* (2013.01); *F01D 11/08* (2013.01); *F02C 7/28* (2013.01); *F16J 15/447* (2013.01);
(Continued)

(58) Field of Classification Search
None
See application file for complete search history.

(56) References Cited

U.S. PATENT DOCUMENTS 2,773,667 A * 12/1956 Wheatley .............. F01D 11/001
416/174
4,662,820 A    5/1987 Sasada et al.
(Continued)

FOREIGN PATENT DOCUMENTS

JP      H04-35601 B2    6/1992
JP      H10-311205 A    11/1998
(Continued)

OTHER PUBLICATIONS

International Search Report dated Apr. 25, 2017, issued in counterpart application No. PCT/JP2017/005978, with English translation. (4 pages).
(Continued)

*Primary Examiner* — Kayla Mccaffrey
(74) *Attorney, Agent, or Firm* — Westerman, Hattori, Daniels & Adrian, LLP

(57) ABSTRACT

A rotary machine includes: a stationary body having a stationary-side peripheral surface; a rotating body having a rotating-side peripheral surface facing the stationary side-peripheral surface. One surface which is one of the stationary-side peripheral surface and the rotating-side peripheral surface has an upstream-side peripheral surface, a downstream-side peripheral surface, and a rearward step surface. The other surface has an upstream-side seal fin forming a minute gap between the upstream-side seal fin and the upstream-side peripheral surface; a downstream-side seal fin forming a minute gap between the downstream-side seal fin and the downstream-side peripheral surface. The rearward step surface has a guide surface extending downstream Da2
(Continued)

while directed toward the other surface and connected to the upstream-side peripheral surface.

1 Claim, 8 Drawing Sheets

(51) Int. Cl.
    *F02C 7/28*     (2006.01)
    *F16J 15/447*     (2006.01)

(52) U.S. Cl.
    CPC ...... *F05D 2220/31* (2013.01); *F05D 2220/32* (2013.01); *F05D 2240/55* (2013.01)

(56) References Cited

U.S. PATENT DOCUMENTS

| | | | |
|---|---|---|---|
| 5,639,095 | A | 6/1997 | Rhode |
| 6,102,655 | A | 8/2000 | Kreitmeier |
| 8,206,082 | B2* | 6/2012 | Sanchez ............... F16J 15/4472 415/110 |
| 9,057,279 | B2* | 6/2015 | Lotfi .................... F16J 15/4472 |
| 2008/0124215 | A1 | 5/2008 | Paolillo et al. |
| 2010/0276892 | A1 | 11/2010 | Sanchez et al. |
| 2012/0121393 | A1 | 5/2012 | Kuwamura et al. |
| 2013/0129493 | A1 | 5/2013 | Matsumoto et al. |
| 2013/0149118 | A1 | 6/2013 | Lotfi et al. |
| 2013/0251534 | A1* | 9/2013 | Matsumoto ............ F01D 5/225 416/223 R |
| 2013/0272855 | A1* | 10/2013 | Kuwamura ............. F01D 11/04 415/173.5 |
| 2016/0333714 | A1 | 11/2016 | Matsumoto et al. |

FOREIGN PATENT DOCUMENTS

| | | |
|---|---|---|
| JP | H11-051200 A | 2/1999 |
| JP | 2001-123803 A | 5/2001 |
| JP | 2005-180278 A | 7/2005 |
| JP | 2006-052808 A | 2/2006 |
| JP | 2008-075510 A | 4/2008 |
| JP | 4199855 B2 | 12/2008 |
| JP | 2010-261441 A | 11/2010 |
| JP | 2010-275957 A | 12/2010 |
| JP | 2011-80452 A | 4/2011 |
| JP | 2012-002234 A | 1/2012 |
| JP | 2012-72689 A | 4/2012 |
| JP | 2013-19537 A | 1/2013 |
| JP | 5517910 B2 | 6/2014 |
| JP | 2014-141955 A | 8/2014 |
| JP | 2015-096730 A | 5/2015 |
| JP | 2015-169077 A | 9/2015 |
| WO | 95/01524 A1 | 1/1995 |
| WO | 2012/043254 A1 | 4/2012 |
| WO | 2014/115706 A1 | 7/2014 |

OTHER PUBLICATIONS

Written Opinion dated Apr. 25, 2017, issued in counterpart application No. PCT/JP2017/005978, with English translation. (17 pages).

* cited by examiner

ROTARY MACHINE

TECHNICAL FIELD

The present invention relates to a rotary machine comprising a stationary body and a rotating body.

This application claims priority from Japanese Patent Application No. 2016-030236 filed on Feb. 19, 2016, the content of which is incorporated herein by reference.

BACKGROUND TECHNOLOGY

As is well known, one type of steam turbine, which is a rotary machine, includes a casing, a shaft body (rotor) provided in a rotatable manner inside the casing, a plurality of stator blades fixedly arranged on an inner peripheral portion of the casing, and a plurality of rotating blades radially provided on the shaft body at a downstream side of the plurality of stator blades.

In the case of an impulse turbine of such a steam turbine, pressure energy of steam (fluid) is converted into velocity energy by the stator blades, and this velocity energy is converted into rotational energy (mechanical energy) by the rotating blades. In addition, in the case of a reaction turbine, pressure energy is converted into velocity energy even in the rotating blades, and is converted into rotational energy (mechanical energy) by reaction force from which the steam is ejected.

In such a steam turbine, a radial gap is formed between a tip portion of the rotating blade and a casing that surrounds the rotating blades and forms a flow path of steam, and a radial gap is also formed between a tip portion of the stator blade and the shaft body.

However, leaked steam passing through the gap between the tip portion of the rotating blade and the casing does not impart rotational force to the rotating blades. Moreover, leakage steam passing through the gap between the tip of the stator blade and the shaft body to a downstream side is not converted into velocity energy by the stator blades, and therefore hardly imparts rotational force to the rotating blades disposed at the downstream side. Therefore, in order to improve the performance of the steam turbine, it is important to reduce the flow rate (leakage flow rate) of the leaked steam passing through the gap.

Conventionally, as disclosed in, for example, Patent Document 1, a turbine has been proposed in which a plurality of step portions whose heights gradually increase from an upstream side in an axial direction toward a downstream side are provided at a tip portion of a rotating blade, a plurality of seal this extending toward the respective step portions are provided to the casing, and a minute gap is formed between each step portion and the tip of each seal fin.

In this turbine, when the fluid entering from the upstream side into the gap collides with a step surface of the step portion, a main vortex is generated on an upstream side of the step surface, and a separation vortex is generated on a downstream side of the step surface (vicinity of an upstream side of the minute gap). Then, by the separation vortex generated in the vicinity of the upstream side of the minute gap, it is possible to reduce the leakage flow that passes through the minute gap and passes through the minute gap. In other words, it is possible to reduce the flow rate of the leaked fluid passing through the gap between the tip portion of the rotating blade and the casing.

PRIOR ART DOCUMENT

Patent Document

[Patent Document 1] Japanese Unexamined Patent Publication No. 2011-080452.

SUMMARY OF THE INVENTION

Problems to be Solved by the Invention

However, there is a strong desire to improve the performance of steam turbines, and therefore, it is desirable to further reduce the leakage flow rate.

The object of the present invention is to provide a rotary machine capable of further reducing a flow rate of a leaked fluid.

Means for Solving the Problem

A first aspect of the present invention provides a rotary machine that includes: a stationary body having a stationary-side peripheral surface extending in a circumferential direction of an axis; and a rotating body that rotates around the axis and has a rotating-side peripheral surface facing the stationary-side peripheral surface, wherein one surface which is one of the stationary-side peripheral surface and the rotating-side peripheral surface includes: an upstream-side peripheral surface extending in an axial direction; a downstream-side peripheral surface that is located on a downstream side of a fluid on the upstream-side peripheral surface and extends in the axial direction and retreats from the other surface which is the other of the stationary-side peripheral surface and the rotating-side peripheral surface with respect to the upstream-side peripheral surface; a rearward step surface that connects the upstream-side peripheral surface and the downstream-side peripheral surface and faces the downstream side; an upstream-side seal fin extending from the other surface toward the upstream-side peripheral surface and forming a minute gap between the upstream-side seal fin and the upstream-side peripheral surface; and a downstream-side seal fin extending from the other surface toward the downstream-side peripheral surface and forming a minute gap between the downstream-side seal fin and the downstream-side peripheral surface, and wherein a guide surface that extends toward the downstream side while directed toward the other surface and is connected to the upstream-side peripheral surface.

According to this configuration, by disposing the rearward step surface on the upstream side of the downstream-side seal fin, it is possible to form a separation vortex on the upstream side of the downstream-side seal fin. Since this separation vortex causes a flow of directing a velocity vector toward the one surface side on the upstream side of the downstream-side seal fin, it is possible to exhibit a contraction effect that reduces the leakage flow through the minute gap.

Also, the rearward step surface has a guide surface so that a separation vortex formed between the downstream-side seal fin and the rearward step surface can be strengthened. Thus, it is possible to further enhance the contraction effect of the fluid flowing through the minute gap caused by the separation vortex, and to further reduce the flow rate of the leaked fluid.

A second aspect of the present invention provides the rotary machine according to the first aspect, and the upstream-side seal fin and the downstream-side seal fin may be inclined toward the upstream side while directed toward the one surface side.

According to this configuration, it is possible to smoothly form a main vortex formed in a cavity between the upstream-side seal fin and the downstream-side seal fin when the fluid flowing into the downstream-side from between the upstream-side seal fin and the upstream-side peripheral surface collides with the downstream-side seal fin. As the result, it possible to strengthen the main vortex and thus to strengthen the separation vortex.

A third aspect of the present invention provides the rotary machine according to the first or second aspect and the rearward step surface and the downstream-side peripheral surface may be smoothly connected.

According to this configuration, it is possible to strengthen the separation vortex formed between the downstream-side seal fin and the rearward step face.

A fourth aspect of the present invention provides the rotary machine according to any one of the first to third aspects, and a fin arcuate portion that smoothly connects the upstream-side seal fin, the downstream-side seal fin, and the other surface may be provided.

According to this configuration, it is possible to strengthen the main vortex formed in the cavity between the upstream-side seal tin and the downstream-side seal fin, and thus, it is possible to strengthen the separation vortex.

A fifth aspect of the present invention provides the rotary machine including: a stationary body having a stationary-side peripheral surface extending in a circumferential direction of an axis; and a rotating body that rotates around the axis and has a rotating-side peripheral surface facing the stationary-side peripheral surface, wherein one surface which is one of the stationary-side peripheral surface and the rotating-side peripheral surface includes: an upstream-side peripheral surface extending in an axial direction; a central peripheral surface that is located on a downstream side of the working fluid on the upstream-side peripheral surface and extends in the axial direction, and that protrudes toward the other surface which is the other of the stationary-side peripheral surface and the rotating side peripheral surface as compared with the upstream-side peripheral surface; a downstream-side peripheral surface that is located on the downstream side of the central peripheral surface and extends in the axial direction and retreats from the other surface as compared with the central peripheral surface; and a forward step surface that connects the upstream-side peripheral surface and the central peripheral surface and faces toward the upstream side, wherein an upstream-side seal fin that extends from the other surface toward the upstream-side peripheral surface and forms a minute gap between the upstream-side seal fin and the upstream-side peripheral surface; a center seal fin that extends from the other surface toward the central peripheral surface and forms a minute gap between the center seal fin and the central peripheral surface; and a downstream-side seal fin that extends from the other surface toward the downstream-side peripheral surface and forms a minute gap between the downstream-side seal fin and the downstream-side peripheral surface; wherein the forward step surface has a guide surface that is inclined toward the downstream side while directed toward the other surface and is connected to the central peripheral surface, and the upstream-side seal fin, the center seal fin, and the downstream-side seal fin are inclined toward the upstream side while directed toward the one surface side.

According to such a configuration, it is possible to form a separation vortex on an upstream side of each seal fin. This separation vortex generates a flow that directs a velocity vector toward the one surface side on an upstream side of each seal fin, and thus can exhibit a contraction effect that reduces leakage flow through the minute gap. Further, since the guide surface and the seal fin are formed at an inclination, the main vortex is formed along the seal fin. As a result, it possible to strengthen the main vortex and thus to strengthen the separation vortex.

Effect of Invention

According to the present invention, by disposing the rearward step surface on an upstream side of the downstream-side seal fin, a separation vortex can be formed on the upstream side of the downstream-side seal fin. Since this separation vortex causes a flow of directing the velocity vector toward the one surface side on the upstream side of the downstream-side seal fin, it is possible to exhibit a contraction effect that reduces the leakage flow through the minute gap.

Also, the rearward step surface has a guide surface so that a separation vortex formed between the downstream-side seal fin and the rearward step surface can be strengthened. Thus, it is possible to further enhance the contraction effect of the fluid flowing through the minute gap caused by the separation vortex and to further reduce the flow rate of the leaked fluid.

MODE FOR CARRYING OUT THE INVENTION

First Embodiment

Hereinafter, a steam turbine which is a rotary machine according to a first embodiment of the present invention will be described in detail with reference to the accompanying drawings.

Figure 1:
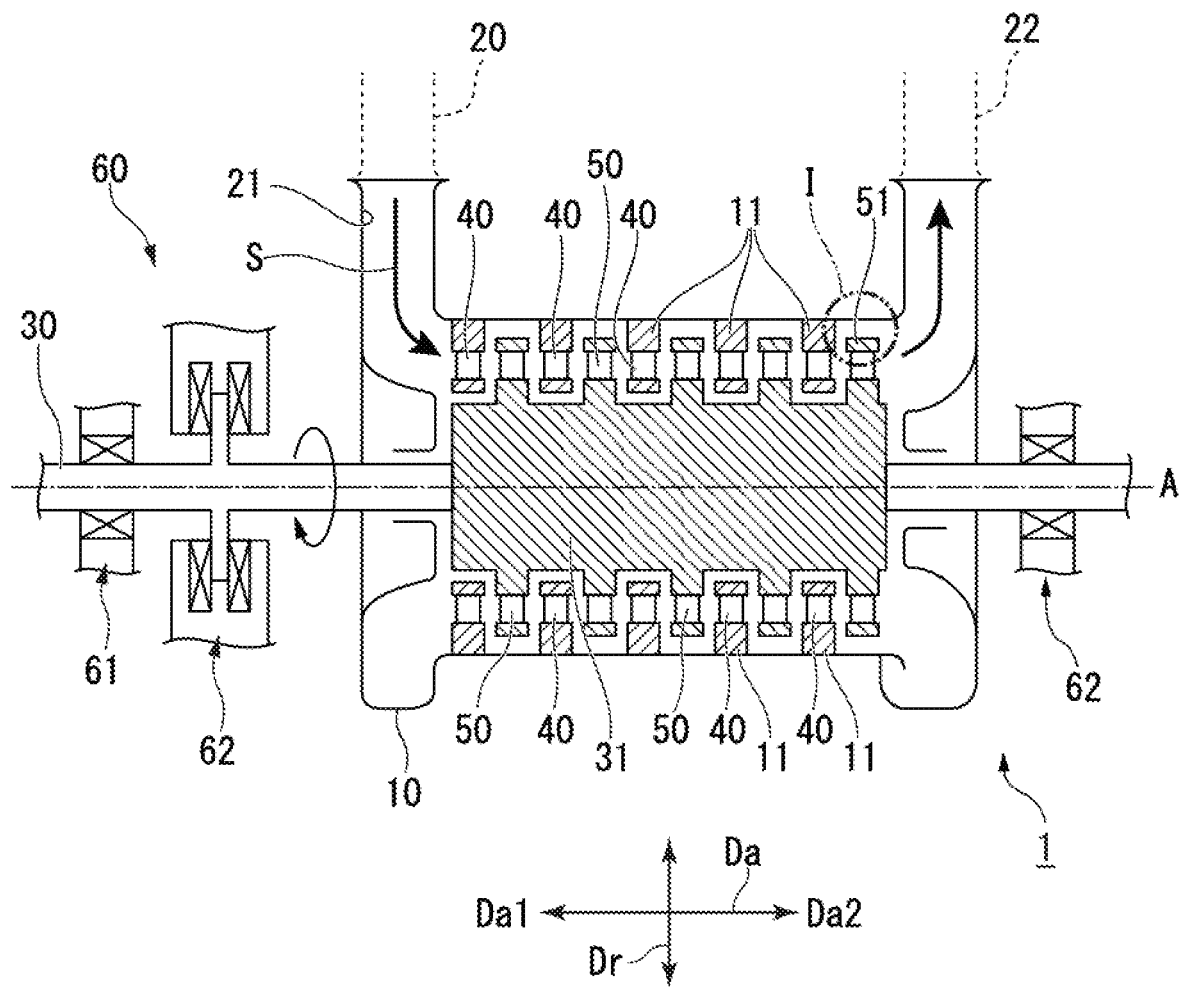
FIG. 1 is a schematic cross-sectional diagram of a steam turbine according to a first embodiment of the present invention.

As shown in FIG. 1, a steam turbine 1 according to the present embodiment includes a casing 10 which is a stationary body, a rotating shaft 30 which is a rotating body provided inside the casing 10 so as to be rotatable about an axis thereof and transmitting power to a machine such as a power generator (not shown), a stator blade 40 which is held by the casing 10, a rotating blade 50 which is provided on the rotating shaft 30, and a bearing portion 60 which supports the rotating shaft 30 so as to be rotatable about an axis of thereof.

In addition, in the following description, the direction in which the axis A of the rotation shaft 30 extends is defined as an axial direction Da. Further, a direction orthogonal to the axis A is defined as a radial direction Dr, a side (direction) away from the axis A in the radial direction Dr is called an outer side in the radial direction, and a side (direction) towards the axis A in the radial direction Dr is defined as an inside in the radial direction. In addition, in the axial direction Da, the left side of FIG. 1 is referred to as an upstream side Da1, and the right side of FIG. 1 is referred to as a downstream side Da2.

The steam 5, which is a fluid, is introduced from a main flow inlet 21 formed in the casing 10 via a steam supply pipe 20 connected to a steam supply source (not shown) and is discharged from a steam discharge pipe 22 connected to a downstream side of the steam turbine 1.

In the casing 10, an internal space is hermetically sealed, and a flow path of the steam S is used. A ring-shaped partition plate outer ring 11, into which a rotary shaft 30 is inserted, is firmly fixed on an inner wall surface of the casing 10.

The bearing portion 60 includes a journal bearing device 61 and a thrust bearing device 62 and supports the rotation shaft 30 in a freely rotatable manner.

The stator blade 40 extends from the casing 10 toward the inner peripheral side, and a plurality of the stator blades forms an annular stator blade group by being radially arranged so as to surround the rotating shaft 30, and each stator blade is held by the partition plate outer ring 11 described above.

A plurality of the annular stator blade groups consisting of the plurality of stator blades 40 is formed at intervals in the axial direction Da, and the pressure energy of the steam S is converted into velocity energy and flows into the rotating blade 50 adjacent to the downstream side.

The rotating blade 50 is firmly attached to an outer peripheral portion of a rotating shaft body 31 of the rotating shaft 30, and a plurality of the rotating blades forms an annular rotating blade group by being radially arranged on the downstream side of each annular stator blade group.

One stage is constituted by one annular stator blade group and one annular rotating blade group. A tip portion of the rotating blade 50 in the final stage is connected to the tip portions of the rotating blades 50 adjacent to each other in a circumferential direction of the rotating shaft 30 (hereinafter, simply referred to as a circumferential direction) and is called a shroud 51.

Figure 2:
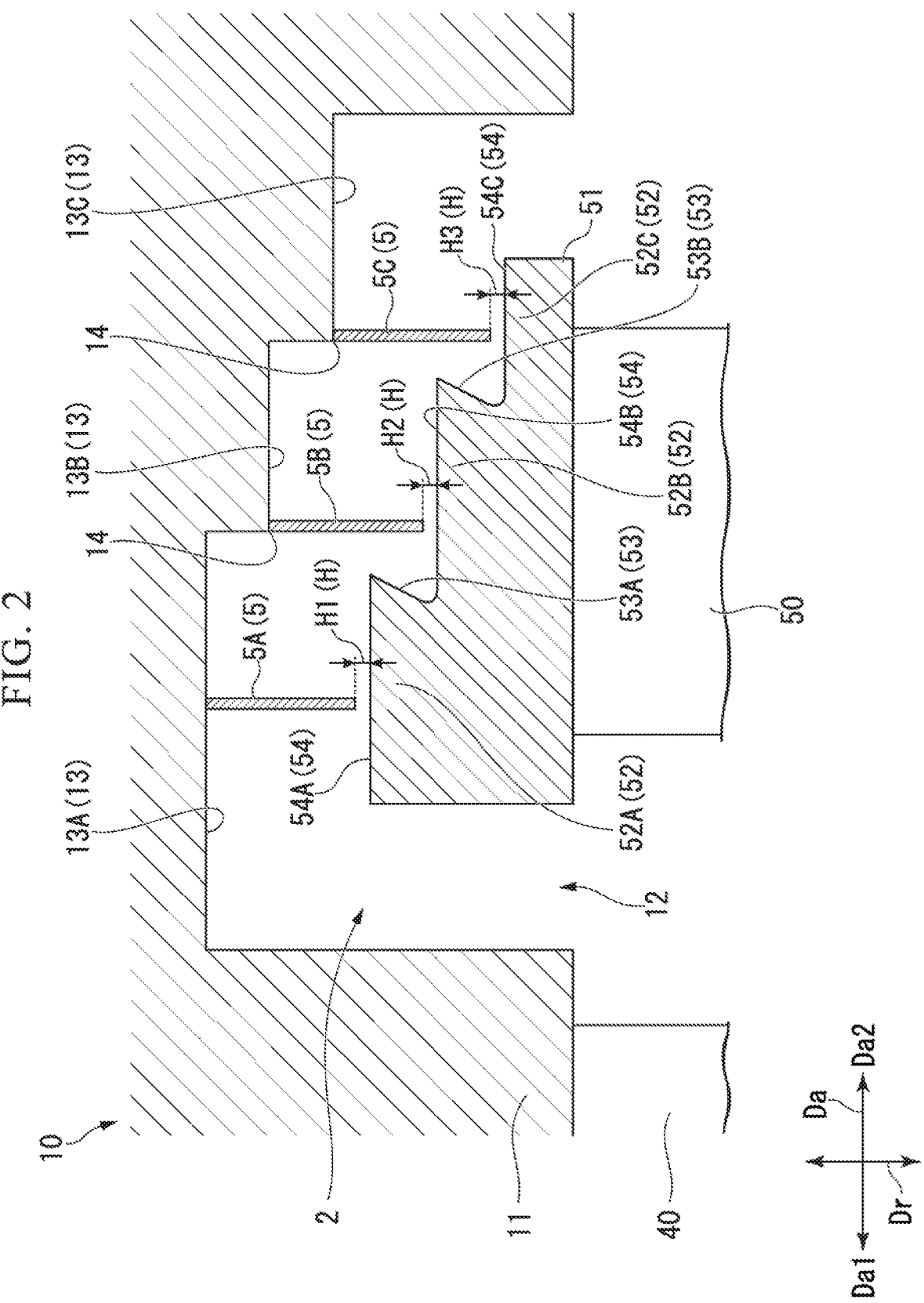
FIG. 2 is a diagram showing the first embodiment of the present invention, and is an enlarged cross-sectional view showing a main portion 1 in FIG. 1.

As shown in FIG. 2, a shroud 51 forming a tip portion of the rotating blade 50 is disposed opposite to the partition plate outer ring 11 of the casing 10 with a gap in a radial direction Dr being interposed therebetween. A seal structure 2A is provided between the shroud 51 and the partition plate outer ring 11 of the casing 10. The seal structure 2A is a structure for sealing between the partition plate outer ring 11 which is a stationary body and the shroud 51 which is a rotating body. Hereinafter, the constituent elements of the seal structure 2A will be described in detail.

The shroud 51 has an outer peripheral surface 54 (rotating side peripheral surface) which faces the partition plate outer ring 11. On the outer peripheral surface 54 of the shroud 51, which faces the outside in the radial direction, a plurality of steps are provided so as to decrease in diameter toward the downstream side.

The shroud 51 of the present embodiment has three step portions 52 arranged in the axial direction Da by providing two steps. The step portion 52 includes a first step portion 52A disposed on the most upstream side, a third step portion 52C disposed on the most downstream side, and a second step portion 52B disposed between the first step portion 52A and the third step portion 52C.

An outer diameter of the three step portions 52 is set so as to gradually decrease from the upstream side to the downstream side in the axial direction Da.

The adjacent step portions 52 are connected to each other by a rearward stepped surface 53 which is a step. The rearward step face 53 faces a downstream side in the axial direction Da. A first rearward step face 53A is formed between the first step portion 52A and the second step portion 52B, and a second rearward step face 53B is formed between the second step portion 52B and the third step portion 52C. The first rearward step surface 53A and the second rearward step surface 53B have substantially the same cross-sectional shape as seen from the circumferential direction.

An annular groove 12 extending in the circumferential direction is formed in the partition plate outer ring 11 at a portion corresponding to the shroud 51. The annular groove 12 is recessed to the outside in the radial direction from an inner peripheral surface of the partition plate outer ring 11. The shroud 51 extends into the annular groove 12. Three annular recess portions 13 (stationary-side peripheral surfaces) are formed so as to be arranged in an axial direction Da on a bottom of the annular groove 12 facing the inside in the radial direction to face the three step portions 52. The three annular recess portions 13 gradually decrease in diameter from the upstream side Da1 toward the downstream side Da2 due to the respective steps.

Each casing-side edge portion 14 located at the boundary of two annular recess portions 13 adjacent to each other in the axial direction Da is provided with a seal fin 5 extending to the inside in the radial direction toward the shroud 51. The positions of the casing-side edge portion 14 and the seal fin 5 in the axial direction Da are set so as to face the outer peripheral surface 54 of each step portion 52.

Three sealing fins 5 are arranged at a distance in the axial direction Da and are provided so as to correspond to three step portions 52 in a ratio of 1:1. The three seal fins 5 are arranged at equal intervals in the axial direction Da. Hereinafter, the seal fin 5 extending toward an outer peripheral surface 54A of the first step portion 52A is referred to as a first seal fin 5A (an upstream-side seal fin), a seal fin 5 extending toward an outer peripheral surface 54B of the second step portion 52B is referred to as a second seal fin 5B (a downstream-side seal fin), and a seal fin 5 extending toward an outer peripheral surface 54C of the third step portion 52C is referred to as a seal fin 5C.

A minute gap H in the radial direction Dr is formed between the outer peripheral surface 54 of each step portion 52 and a tip of each seal fin 5. The size of each minute gap H is set to a minimum value within a safe range in which the two do not come into contact with each other in consideration of the thermal expansion amount of the casing 10 and the rotating blade 50, the centrifugal elongation amount of the rotating blade 50, and the like. In the present embodiment, the sizes of the three minute gaps H1, H2, and H3 are set to be equal to each other.

Figure 3:
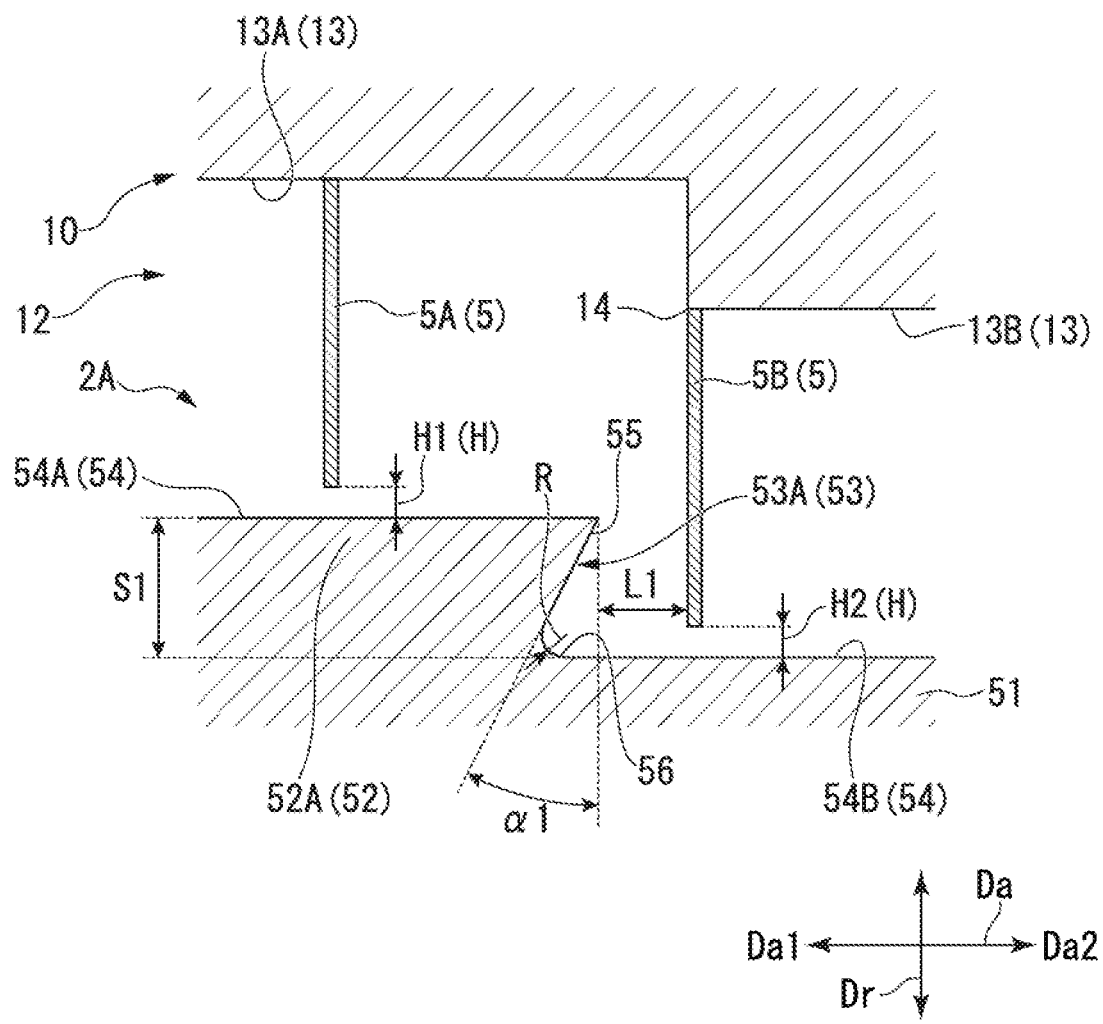
FIG. 3 is a diagram showing the first embodiment of the present invention and is an enlarged cross-sectional view showing a seal structure of FIG. 2.

Here, the seal structure 2A of the present embodiment will be described using the first step portion 52A, the second step portion 52B, and the first rearward step surface 53A. As shown in FIG. 3, the first step portion 52A has the outer peripheral surface 54A extending in the axial direction Da (hereinafter, referred to as an upstream-side peripheral surface 54A). The second step portion 52B has the outer peripheral surface 54B extending in the axial direction Da (hereinafter, referred to as a downstream-side peripheral surface 54B). The downstream peripheral surface 54B is located on the downstream side of the upstream-side peripheral surface 54A and retreats from the upstream-side peripheral surface 54A in the radial direction Dr with respect to the annular recess portion 13. In other words, the downstream-side peripheral surface 54B is located at the inside of the upstream peripheral surface 54A in the radial direction. The upstream-side peripheral surface 54A and the downstream-side peripheral surface 54B have a cylindrical shape that is coaxial with the axis A.

The rearward step surface 53 has a guide surface 55 which extends toward the downstream side Da2 while directed toward the outside in the radial direction (annular recess portion 13) and is connected to the upstream-side peripheral surface 54A. That is, the guide surface 55 is not formed so as to be orthogonal to the axis A and is formed in a tapered shape in which the diameter thereof gradually increases toward the downstream side Da2. In other words, the rearward step face 53 is inclined so that the outside of the rearward step face 53 in the radial direction is at the downstream side Da2 as compared with the inside of the rearward step face 53 in the radial direction.

In the cross-sectional shape of the guide surface 55 when seen from the circumferential direction, an angle $\alpha 1$ of the guide surface 55 with respect to a plane perpendicular to the axis A is preferably set to $0° < \alpha 1 \leq 30°$.

The rearward step surface 53 has an arcuate portion 56 which smoothly connects the rearward step surface 53 and the downstream-side peripheral surface 54B. The surface of the arcuate portion 56 has an arc cross-sectional shape as viewed in the circumferential direction. The radius of curvature R of the surface of the arcuate portion may be arbitrary when the height of the first step portion 52A (a distance in the radial direction Dr between the upstream-side peripheral surface 54A and the downstream-side peripheral surface 54B) is set to be S1.

When the distance between the second seal fin 5B and the lower end portion of the upstream-side peripheral surface 54A (an end portion at the outside of the guide surface 55 in the radial direction) is defined as L, and the size of the minute gap between the first seal fin 5B and the downstream-side peripheral surface 54B is defined as H2, then the first step portion 52A and the second seal fin 5B are formed so as to satisfy the following expression (1).

$$1.5 \leq L/H2 \leq 5.0 \quad (1)$$

In other words, the distance L is set to be substantially 1.5 to 5.0 times as large as that of the minute gap H2. It is most preferred to set to L/H2=2.0, and the seal structure 2A of the present embodiment is set to L/H2=2.0.

An operation of the steam turbine 1 will be described below.

First, steam S flows into the internal space of the casing 10 from a steam S supply source such as a boiler (not shown) via a steam supply pipe 20.

The steam S flowing into the internal space of the casing 10 sequentially passes through the annular stator blade group and the annular rotating blade group in each stage. At this time, the pressure energy is converted into velocity energy by the stator blades 40, most of the steam S passing through the stator blades 40 flows between the rotating blades 50 forming the same stage, and the velocity energy and pressure energy of the steam S are converted into rotational energy by the rotating blades 50, so that a rotation is imparted to the rotating shaft 30. On the other hand, part of the steam S (for example, a few % of the steam S) flows out from the stator blades 40, and then flows into the annular groove (the gap between the shroud 51 of the rotating blade 50 and the partition plate outer ring 11 of the casing 10) becomes a so-called leakage steam.

Figure 4:
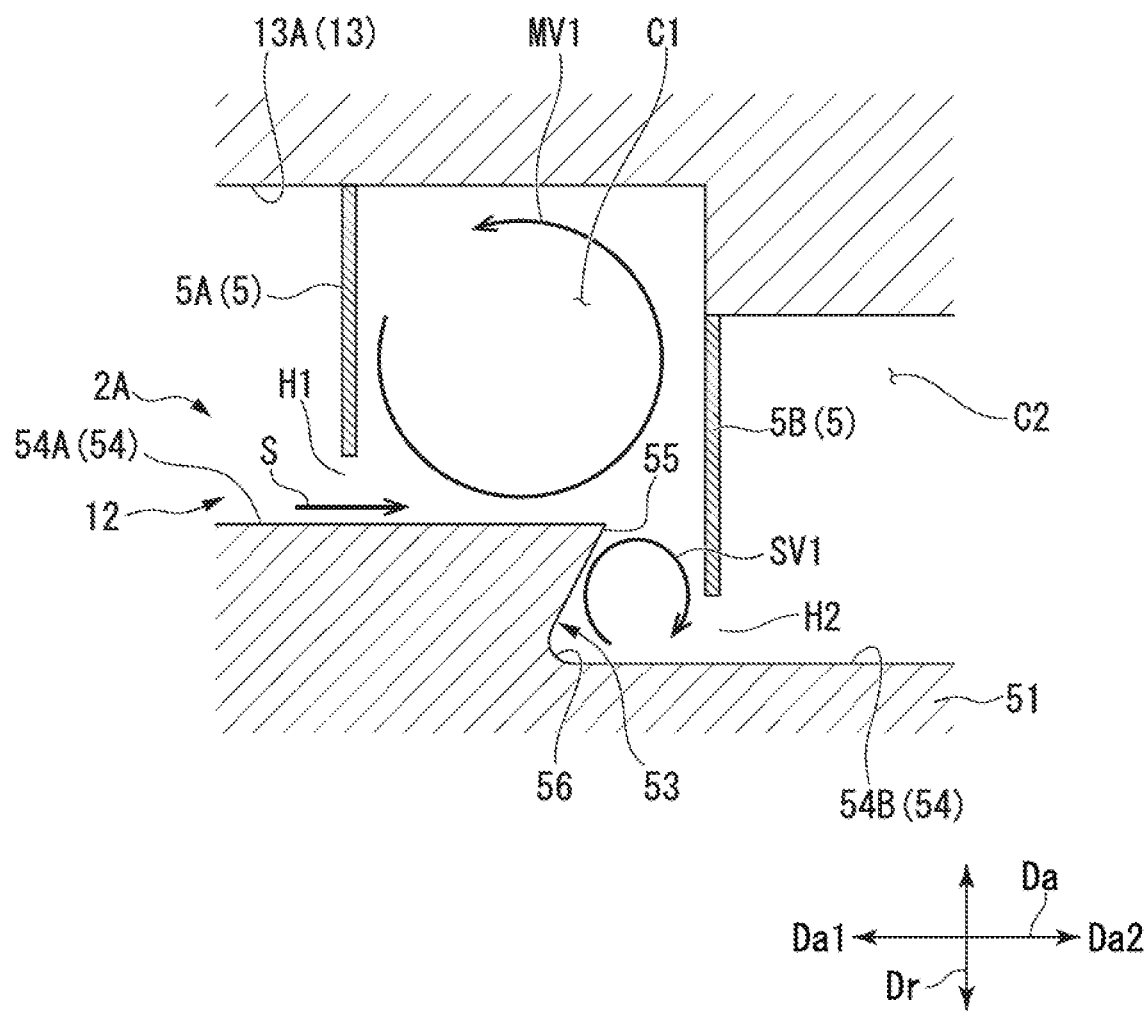
FIG. 4 is an explanatory diagram of an operation of the steam turbine according to the first embodiment of the present invention.

As shown in FIG. 4, among the steam S flowing into the annular groove 12, the steam S flowing into the downstream side Da2 from a space between the first seal fin 5A and the upstream-side peripheral surface 54A collides with the second seal fin 5B and flows so as to return to the upstream side Da1. As a result, a main vortex MV1 which turns in a first rotation direction is generated in a cavity C1 (a space between the adjacent seal fins 5). At this time, part of the flow is separated from the main vortex MV1 at a corner (an edge) of the upstream-side peripheral surface 54A and the rearward step surface 53 (the guide surface 55), so that a separation vortex SV1 that turns in a second rotation direction opposite direction to the main vortex MV1 is generated in the space between the rearward step surface 53 and the second seal fin 5B.

The separation vortex SV1 is located in the vicinity of the upstream side of the minute gap H2 between the downstream-side peripheral surface 54B and the second seal fin 5B. In particular, since a downward flow, of the separation vortex SV1, directed toward the inside in the radial direction occurs immediately before the minute gap H2, a contraction effect which reduces a leakage flow flowing from the cavity C1 through the minute gap H2 and flowing into the downstream side Da2 is obtained by the separation vortex SV1.

The rearward step surface 53 has the guide surface 55 which extends toward the downstream side Da2 while directed toward the outside in the racial direction and is connected to the upstream-side peripheral surface 54A, thereby the separation vortex SV1 formed between the second seal fin 5B and the rearward step surface 53 can be strengthened. As a result, it is possible to further enhance the contraction effect of the steam S passing through the minute gap H2 caused by the separation vortex SV1.

Further, when the distance L is set to be substantially two times as large as the minute gap H2 and assuming that the separation vortex SV1 forms a true circle, a diameter of the separation vortex SV1 becomes two times that of the minute gap H2, and when the outer circumference of the separation vortex SV1 is in contact with the second seal fin 5B, the maximum position of the velocity component directed toward the inside in the radial direction in the downflow of the separation vortex SV1 coincides with the tip of the second seal fin 5B. In this case, since the downflow passes through better immediately before the minute gap H2, the contraction effect on the leakage flow is maximized.

According to the above embodiment, by disposing the rearward step surface 53 on the upstream side of the seal fin 5, it is possible to form the separation vortex SV1 on the upstream side of the seal fin 5. Since the separation vortex SV1 generates a downflow in which a velocity vector is directed toward the inside in the radial direction on the upstream side of the seal fin 5, it is possible to exhibit a contraction effect that reduces a leakage flow passing through the minute gap H.

Further, since the rearward step surface 53 has a guide surface 55 which extends toward the downstream side while directed toward the outside in the radial direction and is connected to the upstream-side peripheral surface 54A, it is possible to strengthen the separation vortex SV1 formed between the seal fin 5 on the downstream side of the guide surface 55 and the rearward step surface 53. As a result, it is possible to thriller enhance the contraction effect of the leaked steam passing through the minute gap H caused by the separation vortex SV1 and to further reduce the flow rate of the leaked steam.

Further, it is possible to strengthen the separation vortex SV1 formed between the seal fin 5 and the rearward step surface 53 by having an arcuate portion 56 which smoothly connects the rearward step surface 53 and the downstream-side peripheral surface 54B.

In addition, in the embodiment described above, the arcuate portion 56 having an arc-shaped cross section is provided between the rearward step surface 53 and the downstream-side peripheral surface 54B; however, the present invention is not limited thereto. For example, as in the modification shown in FIG. 5, the rearward step surface 53 and the downstream-side peripheral surface 54B may be connected so as to form an acute angle without providing an arcuate portion.

Figure 5:
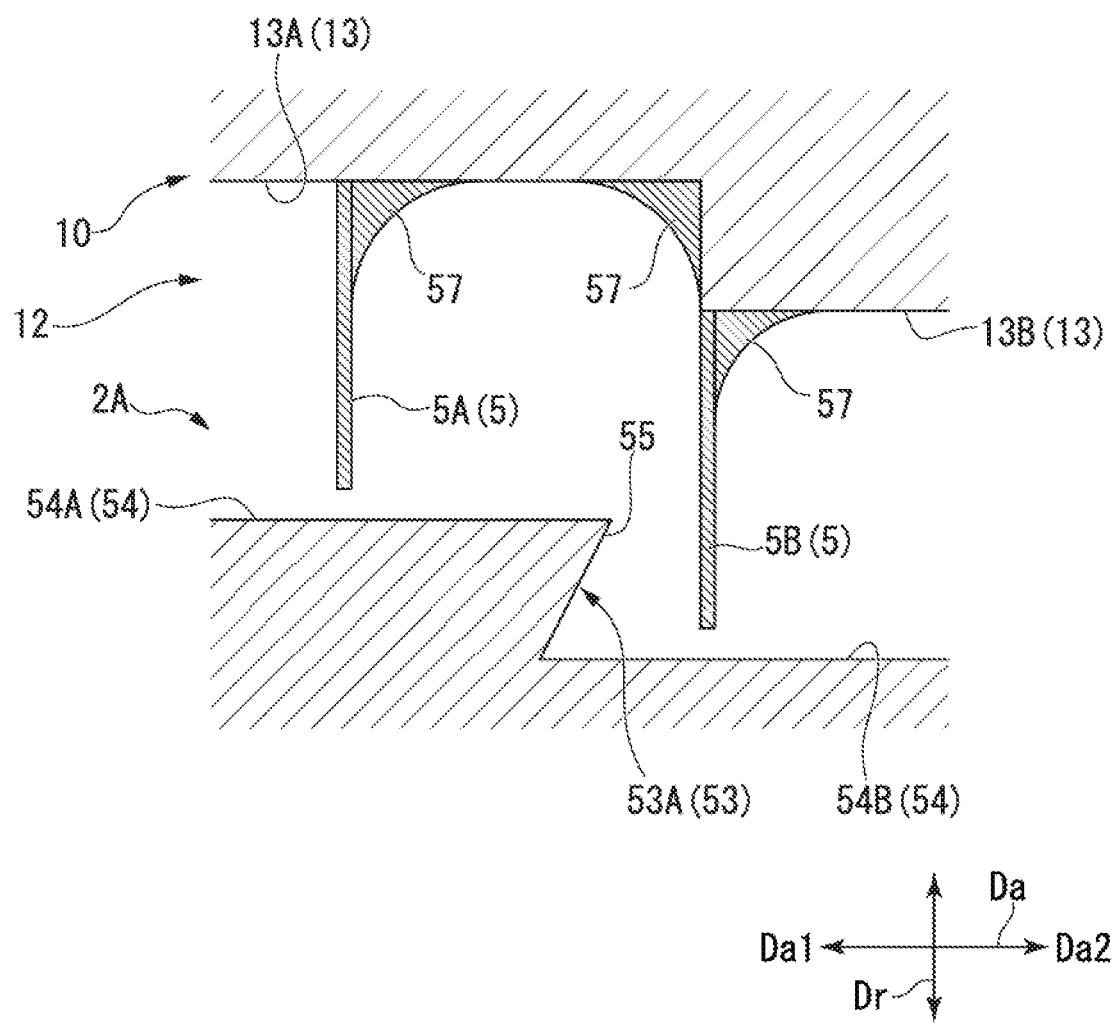
FIG. 5 is an enlarged cross-sectional diagram showing a modification of the seal structure according to the first embodiment of the present invention.

Further, as in the modification shown in FIG. 5, an arcuate portion 57 having an arc-shape which smoothly connects the main surface of the seal fin 5 and the annular recess portion 13 to each other at the connecting portion between the seal fin 5 and the annular recess portion 13 may be provided. It is possible to strengthen the main vortex MV1 generated in the cavity by providing an arcuate portion 57 having an arc shape at the connecting portion of the seal fin 5 and the annular recess portion 13.

In addition, the above embodiment describes the case in which an annular groove 12 is formed at a portion of the partition plate outer ring 11 corresponding to the shroud 51, and the annular groove 12 is configured by three annular recess portions 13 which are gradually reduced in diameter by steps so as to correspond to the three step portions 52. However, the present invention is not limited to this, and the whole of the annular groove 12 may be formed to have substantially the same diameter.

Second Embodiment

Figure 6:
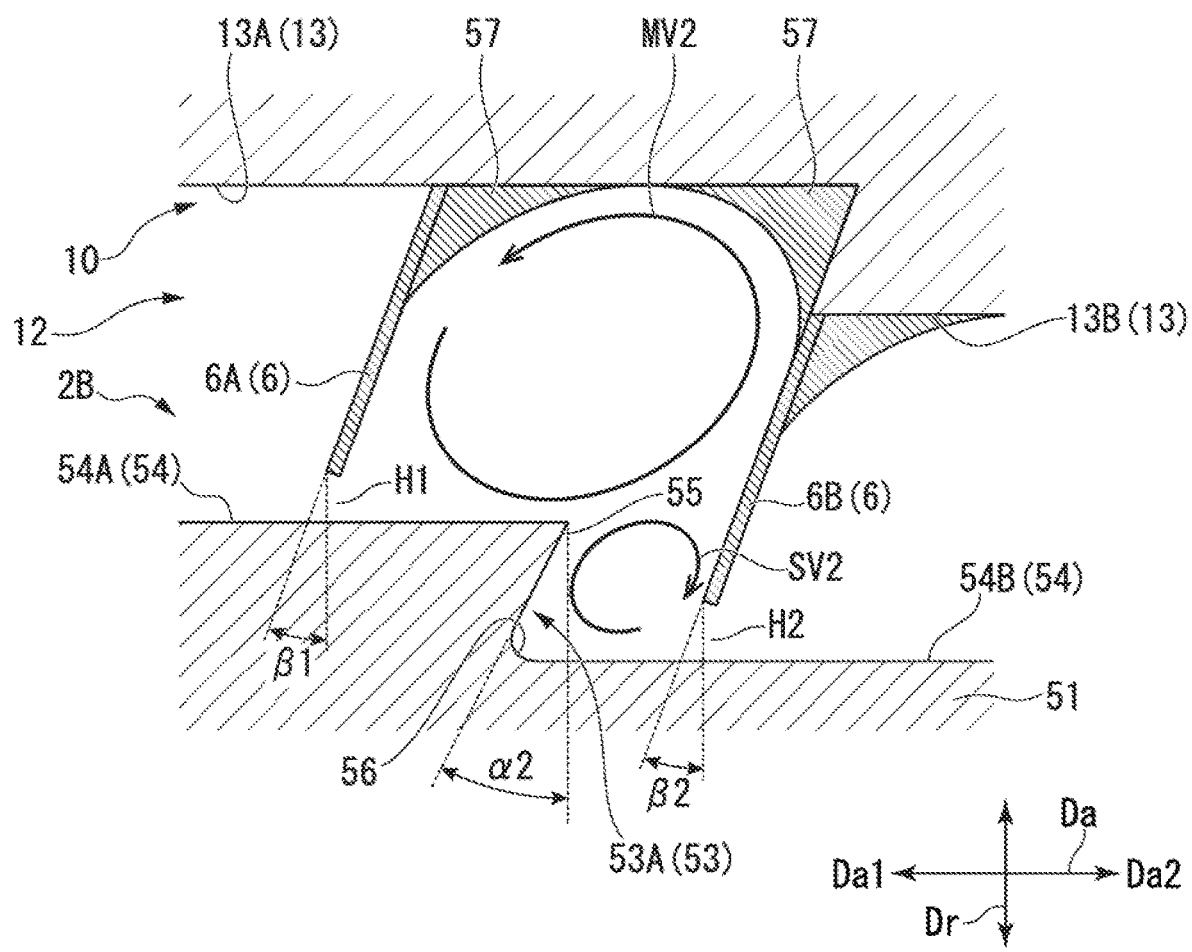
FIG. 6 is an enlarged cross-sectional diagram showing a seal structure according to a second embodiment of the present invention.

Hereinafter, a seal structure 2B according to a second embodiment of the present invention will be described in detail with reference to the accompanying drawings. In addition, in the present embodiment, differences from the first embodiment described above will be mainly described, and description of the same parts will be omitted. As shown in FIG. 6, the seal fin 6 of the seal structure 2B of the present embodiment is inclined toward the upstream side Da1 while directed toward the inside in the radial direction (the shroud 51). That is, the main surface of the seal fin 6 is not formed so as to be orthogonal to the axis A and is formed in a tapered shape in which the diameter gradually increases toward the downstream side Da2. In other words, the seal fin 6 is inclined so that the outer side of the seal fin 6 in the radial direction is located on the downstream side of the inside thereof in the radial direction.

Assuming that an angle of a first seal fin 6A with respect to a plane orthogonal to the axis A is $\beta 1$, an angle of the guide surface 55 with respect to a plane orthogonal to the axis A is $\alpha 2$, and an angle of a second seal fin 6B with respect to a plane orthogonal to the axis A is $\beta 2$, the seal structure 2B of the present embodiment is formed so as to satisfy the following Expressions (2), (3), and (4).

$$10° \leq \beta 1 \leq 25° \qquad (2)$$

$$10° \leq \beta 2 \leq 25° \qquad (3)$$

$$0° < \alpha 2 \leq \beta 2 + 30° \qquad (4)$$

According to the above embodiment, since the seal fin 6 is inclined, it is possible to form the main vortex MV2 more smoothly when steam flowing into the downstream side Da2 from the minute gap H1 between the first seal fin 6A and the upstream-side peripheral surface 54A collides with the second seal fin 6B. As a result, it is possible to strengthen the main vortex MV2 and, in addition, to increase the separation vortex SV2.

In addition, in the seal structure 2B of the present embodiment, although an arcuate portion 57 having an arc shape that smoothly connects the main surface of the seal fin 6 and the annular recess portion 13 is provided at tire connecting portion between the seal fin 6 and the annular recess portion 13, the seal fin 6 and the annular recess portion 13 may be connected without providing an arcuate portion.

Third Embodiment

Hereinafter, a seal structure 2C according to a third embodiment of the present invention will be described in detail with reference to the accompanying drawings. In addition, in the present embodiment, differences from the first embodiment described above will be mainly described, and description of the same parts will be omitted.

Figure 7:
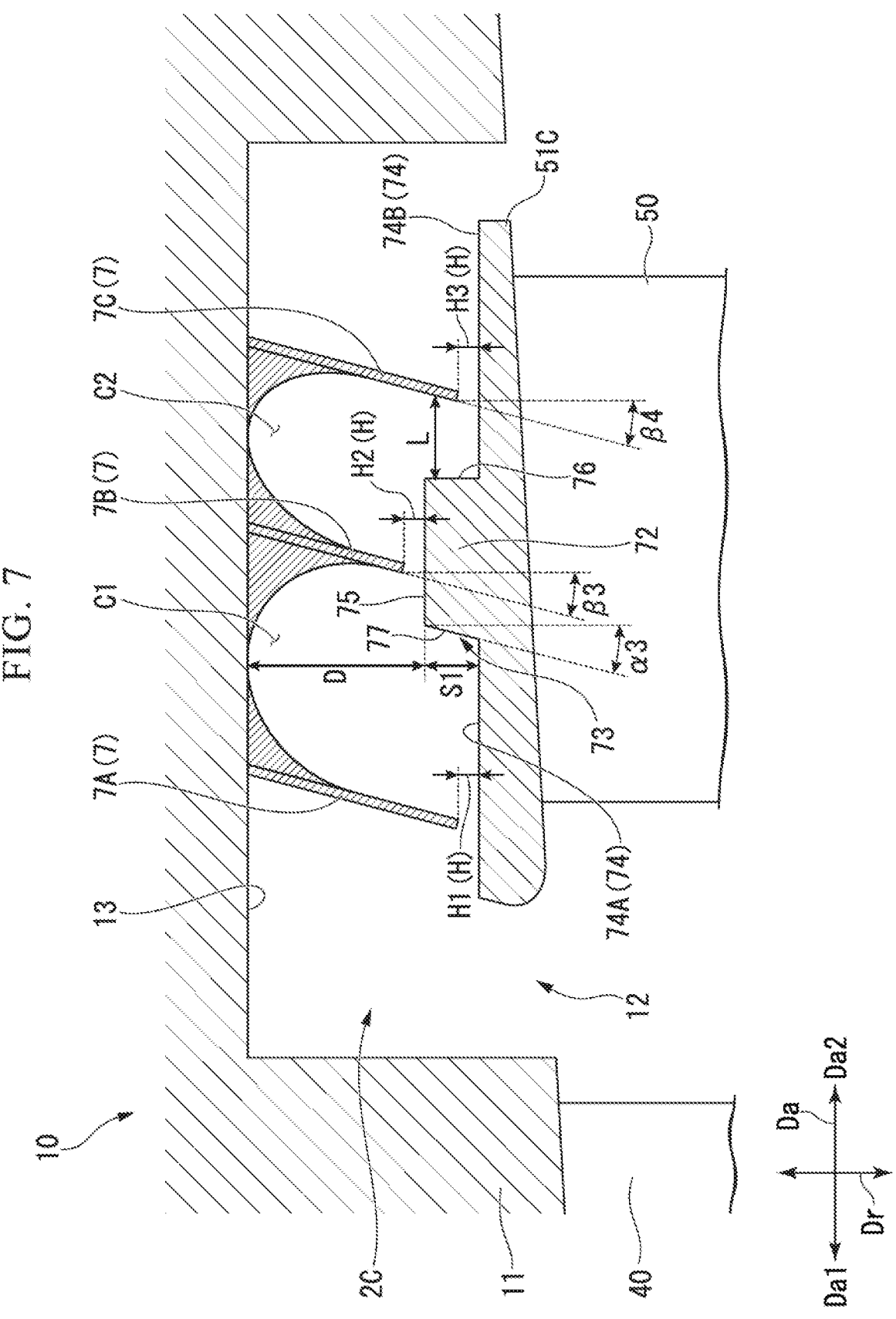
FIG. 7 is an enlarged cross-sectional diagram showing a seal structure according to a third embodiment of the present invention.

As shown in FIG. 7, the shroud 51 of the seal structure 2C of the present embodiment includes a central step portion 72 in which a central portion in the axial direction Da protrudes and is formed in a stepped shape. Specifically, a surface of the shroud 51C on the outside in the radial direction has a base surface 74 and a central step surface 75 (a central peripheral surface) that protrudes toward the outside in the radial direction from the base surface 74.

Hereinafter, the base surface 74 on the upstream side of the central step portion 72 will be referred to as a first base surface 74A, and the base surface 74 on a downstream side of the central step portion 72 will be referred to as a second base surface 74B.

Three seal fins 7 are provided in the annular recess portion 13 and extend in the radial direction Dr toward the shroud 51C. Each of the seal fins 7 extends, toward the shroud 51C, from annular recess portion 13 toward the inside in the radial direction and extends in the circumferential direction.

Specifically, a first seal fin 7A disposed on the most upstream side protrudes toward the first base surface 74A. A second seal fin 7B disposed at the downstream side of the first seal fin 7A protrudes toward the central step surface 75. The third seal fin 7C disposed on the downstream side of the second seal fin 7B protrudes toward the second base surface 74B. The second seal fin 7B is formed so that the length thereof in the radial direction Dr is shorter than that of the first seal fin 7A and the third seal fin 7C.

Further, the seal fin 7 is inclined toward the upstream side while directed toward the inside in the radial direction (the shroud 51). The seal fin 7 has the shroud 51C and the minute gap H formed in the radial direction Dr.

In other words, the seal structure 2C which is a step type labyrinth seal is provided between the partition plate outer ring 11 and the shroud 51C of the present embodiment.

The first base surface 74A and the central step surface 75 are connected by a forward step surface 73. The forward step surface 73 faces upstream Da1 in the axial direction Da.

The central step surface 75 and the second base surface 74B are connected by a rearward step surface 76. The rearward step surface 76 faces downstream Da2 in the axial direction Da.

The forward step surface 73 has a guide surface 77 which inclines toward the downstream side while directed toward the outside in the radial direction (annular recess portion 13) and is connected to the central step surface 75.

An arcuate portion that smoothly connects the forward step surface 73 and the first base surface 74A may be provided.

Assuming that an angle of the second seal fin 7B with respect to a plane orthogonal to the axis A is β3, an angle of the guide surface 77 with respect to a plane orthogonal to the axis A is α3, and an angle of the third seal fin 7C with respect to a plane orthogonal to the axis A is β4, the seal structure 2C of the present embodiment is famed so as to satisfy the following expressions (5), (6), and (7).

$$10° \leq \beta3 \leq 25° \quad (5)$$

$$10° \leq \beta4 \leq 25° \quad (6)$$

$$0° < \alpha3 \leq \beta3 + 30° \quad (7)$$

When the height of the central step surface 74 from the first base surface 75A in the radial direction Dr (the protruding amount of the central step portion 72 relative to the base surface 74) is S1, and the distance between the central step surface 75 and the annular recess portion 13 in the radial direction Dr (the size of the cavity in the radial direction Dr formed between the shroud 51C and the partition plate outer ring 11) is D, the seal structure 2C is formed so as to satisfy the following expression (8).

$$1.5 \times H1 \leq S1 \leq D \quad (8)$$

In other words, the distance S1 is set to be equal to or more than 1.5 times the minute gap H1, and is set equal to or less than the distance D.

Next, an operation of the seal structure 2C according to the present embodiment will be described.

Figure 8:
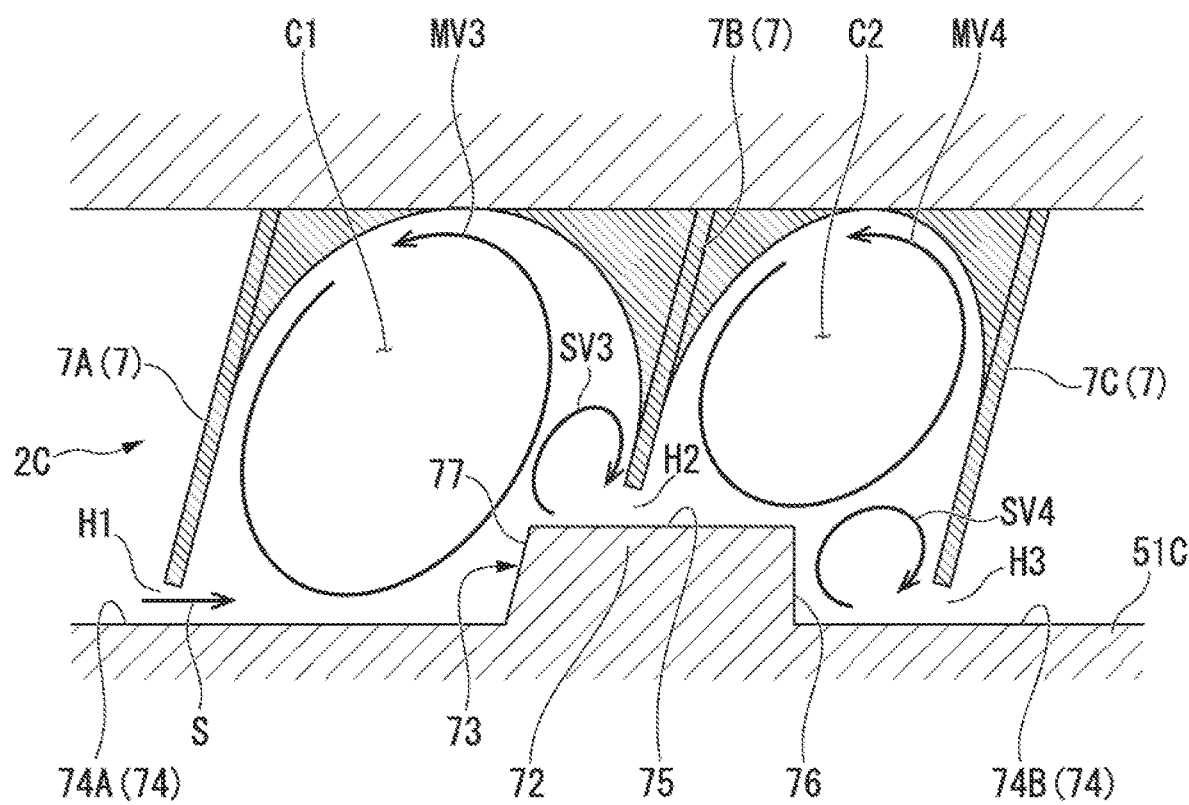
FIG. 8 is an explanatory diagram of an operation of a steam turbine according to the third embodiment of the present invention.
Figure 8:
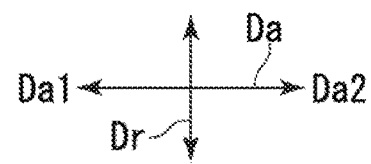

As shown in FIG. 8, when the steam S flowing in the cavity C1 from the minute gap H1 between the first seal fin 7A and the first base surface 74A collides with the forward step surface 73, a main vortex MV3 is generated in the cavity C1.

At this time, part of the flow is separated from the main vortex MV3 at the corner of the guide surface 77 and the central step surface 75, so that a separation vortex SV3 is generated. Similarly to the separation vortex SV1 of the first embodiment, the separation vortex SV3 reduces a leakage flow flowing into the downstream side Da2 through the minute gap H2.

Further, the steam S flowing into the downstream side Da2 from the minute gap H2 collides with the third seal fin 7C, so that the main vortex MV4 is generated in the cavity C2. At this time, part of the flow is separated from the main vortex MV4 at the corner of the central step surface 75 and the rearward step surface 76, so that a separation vortex SV4 is generated.

According to the above embodiment, the guide surface 77 of the forward step surface 73 is formed so as to be inclined, so that the separation vortex SV3 is formed to be smaller. Thus, it is possible to further enhance the contraction effect caused by the separation vortex SV3. Further, it is possible to strengthen the main vortex MV3 by forming the main vortex MV3 along the seal fin 7. By increasing the main vortex MV3, it is possible to strengthen the separation vortex SV3.

Further, since the height S1 of the central step surface 75 from the first base surface 74A is set to be equal to or more than 1.5 times that of the minute gap H1, it is possible to reduce the steam S that flowing through to the minute gap H2 from the minute gap H1. Further, since the width D of the cavity in the radial direction Dr is set to be equal to or larger than the height S1 of the central step surface 75 from the first base surface 74A, the main vortex MV4 formed in the second cavity C2 between the second seal fin 7B and the third seal fin 7C can be enlarged. Thus, it is possible to increase the pressure on the downstream side of the minute gap H2, and it is possible to reduce the amount of the steam S flowing through to the minute gap H2.

In addition, the present invention is not limited to the above-described embodiment, and the present invention includes a variety of modifications to the above-described embodiment without departing from the spirit of the present invention.

For example, the above embodiment describes the case where three seal fins are provided, and thus two cavities are formed. However, the present invention is not limited to this, and the number of the seal fins and the corresponding cavities may be arbitrary, and may be one, three, or four or more.

In addition, in the above-described embodiment, the present invention is applied to the rotating blade 50 and the stator blade 40 of the final stage, but the present invention may be applied to the rotating blade 50 and the stator blade 40 of the other stages.

Further, the above embodiment describes a case where the step portion is formed in the shroud 51 and the seal fin is provided in the partition plate outer ring 11. However, the present invention is not limited thereto, and the present invention may be a configuration in Which the seal tin is provided in the shroud 51 and the step portion is provided in the partition plate outer ring 11.

Further, the step portion may be formed at a tip portion of the stator blade 40, and the seal fin may be provided on the rotating shaft 30. Further, the seal fin may be provided at the tip portion of the stator blade 40, and the step portion may be formed on the rotating shaft 30.

In addition, in the above embodiment, the present invention is applied to a condensate steam turbine; however the present invention can also be applied to another turbine type, for example, a two-stage bleed turbine, an extraction turbine, an air mixing turbine, and the like.

In addition, in the above embodiment, the present invention is applied to a steam turbine; however, the present invention can be applied to a gas turbine, and furthermore, the present invention can be applied to all having the rotary rotating blades.

Further, the seal structure may be applied to a portion where a rotary rotating blade is not provided. For example, the seal structure of the present invention may be applied to a gap between a casing and a rotating shaft.

INDUSTRIAL APPLICABILITY

According to the present invention, by disposing the rearward step surface on the upstream side of the downstream-side seal fin, the separation vortex can be formed on the upstream side of the downstream-side seal fin. Since this separation vortex causes a flow of directing the velocity vector toward one surface side on the upstream side of the downstream-side seal fin, it is possible to exhibit a contraction effect that reduces the leakage flow through the minute gap.

Also, the rearward step surface has the guide surface so that a separation vortex formed between the downstream-side seal fin and the rearward step surface can be strengthened. Thus, it is possible to further enhance the contraction effect of the fluid flowing through the minute gap caused by the separation vortex, and to further reduce the flow rate of the leaked fluid.

EXPLANATION OF REFERENCE SIGN

1: Steam Turbine
2a, 2b, 2c: Seal Structure
5, 6, 7: Seal Fin
5A, 6A, 7A: First Seal Fin
5B, 6B, 7B: Second Seal Fin
5C, 6C, 7C: Third Seal Fin
10: Casing
11: Partition Plate Outer Ring
12: Annular Groove
13: Annular Recess Portion
14: Casing-side edge portion
20: Steam Supply Pipe
21: Main Flow Inlet
22: Steam Discharge Pipe
30: Rotary Shaft
31: Rotation Shaft Body
40: Stator Blade
50: Rotating Blade
51: Shroud
52: Step portion
52A: First Step Portion
52B: Second Step Portion
52C: Third Step Portion
53: Rearward Step Surface
54: Outer Peripheral Surface
54A: Upstream-side Peripheral Surface
54B: Downstream-side Peripheral Surface
55: Guide Surface
56: Arcuate portion
57: Fin Arcuate Portion
60: Bearing Portion
61: Journal Bearing Device
62: Thrust Bearing Device
72: Central Step Portion
73: Forward Step Surface
74: Base Surface
75: Central Step Surface
76: Rearward Step Surface
A: Axis
C: Cavity
Da: Axial Direction
Dr: Radial Direction
H: Minute Gap
S: Steam

The invention claimed is:

1. A rotary machine comprising:
a stationary body having a stationary-side peripheral surface extending in a circumferential direction of an axis; and
a rotating body that rotates around the axis and has a rotating-side peripheral surface facing the stationary-side peripheral surface,
wherein one surface which is one of the stationary-side peripheral surface and the rotating-side peripheral surface includes:
an upstream-side peripheral surface extending in an axial direction;
a central peripheral surface that is located on a downstream side of the working fluid on the upstream-side peripheral surface and extends in the axial direction, and that protrudes toward the other of the stationary-side peripheral surface and the rotating side peripheral surface as compared with the upstream-side peripheral surface;
a downstream-side peripheral surface that is located on the downstream side of the central peripheral surface and extends in the axial direction and retreats from the other surface as compared with the central peripheral surface; and
a forward step surface that connects the upstream-side peripheral surface and the central peripheral surface and faces toward the upstream side, wherein the rotary machine further comprises:
an upstream-side seal fin that extends from the other surface toward the upstream-side peripheral surface and forms a minute gap between the upstream-side seal fin and the upstream-side peripheral surface;
a center seal fin that extends from the other surface toward the central peripheral surface and forms a minute gap between the center seal fin and the central peripheral surface; and
a downstream-side seal fin that extends from the other surface toward the downstream-side peripheral surface and forms a minute gap between the downstream-side seal fin and the downstream-side peripheral surface;
wherein the forward step surface has a guide surface that is inclined toward the downstream side while directed toward the other surface and is connected to the central peripheral surface,
wherein the upstream-side seal fin, the center seal fin, and the downstream-side seal fin are inclined toward the upstream side while directed toward the one surface side, and
wherein, when an angle of the center seal fin with respect to a plane orthogonal to the axis is $\beta 3$, and an angle of the guide surface with respect to a plane orthogonal to the axis is $\alpha 3$, the center seal fin and the guide surface are formed so as to satisfy the following Expression (7), which is $$0° < \alpha 3 \leq \beta 3 + 30° \tag{7}$$

* * * * *